US00RE37693E

(19) United States
(12) Reissued Patent
Sasaki et al.

(10) Patent Number: US RE37,693 E
(45) Date of Reissued Patent: May 7, 2002

(54) COLOR PHOTOGRAPHIC LIGHT-SENSITIVE MATERIAL CONTAINING UV FILTER COMPOUNDS

(75) Inventors: Masao Sasaki; Kaoru Onodera, both of Odawara (JP)

(73) Assignee: Konishiroku Photo Industry Co., Ltd., Tokyo (JP)

(21) Appl. No.: 07/332,400

(22) Filed: Mar. 30, 1989

Related U.S. Patent Documents

Reissue of:
(64) Patent No.: 4,518,686
Issued: May 21, 1985
Appl. No.: 06/500,963
Filed: Jun. 3, 1983

U.S. Applications:

(63) Continuation of application No. 07/055,726, filed on May 21, 1987, now abandoned.

(51) Int. Cl.[7] ..... G03C 1/815
(52) U.S. Cl. ..... 430/512; 430/931
(58) Field of Search ..... 430/512, 931

(56) References Cited

U.S. PATENT DOCUMENTS 3,253,921 A * 5/1966 Sawdey ..... 430/512
3,352,673 A * 11/1967 Graham ..... 430/512
3,698,907 A * 10/1972 Sato et al. ..... 430/512
3,705,805 A * 12/1972 Nittel et al. ..... 430/512
3,794,493 A * 2/1974 Sobel et al. ..... 430/512
3,833,380 A * 9/1974 Crawford et al. ..... 430/931
3,923,519 A * 12/1975 Cieciuch et al. ..... 430/512
3,936,305 A * 2/1976 Hiraishi et al. ..... 430/512
4,208,210 A * 6/1980 Sakai et al. ..... 430/512
4,220,711 A * 9/1980 Nakamura et al. ..... 430/512
4,323,633 A * 4/1982 Beretta ..... 430/512

FOREIGN PATENT DOCUMENTS

GB 1338265 11/1973

* cited by examiner

*Primary Examiner*—Jack P. Brammer
(74) *Attorney, Agent, or Firm*—Finnegan, Henderson, Farabow, Garrett, and Dunner

(57) ABSTRACT

A color photographic light-sensitive material comprising a reflective support having thereon a plurality of silver halide emulsion layers of which the emulsion layer located farthest from said support has, on each of both the support side thereof and the uppermost side at least one nonlight-sensitive layer containing an effective amount of an ultraviolet absorbing agent, said ultraviolet absorbing agent being used in said nonlight-sensitive layer on the uppermost side of said emulsion layer being a 2-(2'-hydroxyphenyl) benzotriazole-type compound which is in the liquid form at normal room temperature.

CORRECTED PATENT
(15) Correction Information:
Corrected Version No. 1 of 4,992,358
See INID code (10), patent number and kind code
Publication Date of Original Version: Feb. 12, 1991.

35 Claims, No Drawings

COLOR PHOTOGRAPHIC LIGHT-SENSITIVE MATERIAL CONTAINING UV FILTER COMPOUNDS

Matter enclosed in heavy brackets [ ] appears in the original patent but forms no part of this reissue specification; matter printed in italics indicates the additions made by reissue.

*This application is a continuation of application Ser. No. 055,726, filed May 21, 1987, now abandoned, which is a Reissue Application of Ser. No. 500,963, filed Jun. 3, 1983 and issued as U.S. Pat. No. 4,518,686.*

BACKGROUND OF THE INVENTION

1. Field of the Invention

The present invention relates particularly to a color photographic light-sensitive material for use in making photographic prints.

2. Prior Art and the Problems Thereof

Conventionally color photographic light-sensitive materials for use in making photographic prints are generally formed by coating in order on a reflective support an yellow coupler-containing blue-sensitive silver halide emulsion layer, nonlight-sensitive first interlayer, magenta coupler-containing green-sensitive silver halide emulsion layer, nonlight-sensitive second interlayer, cyan coupler-containing red-sensitive silver halide emulsion layer and nonlight-sensitive protective layer.

And particularly in order to prevent the discoloration by ultraviolet rays of the dyes formed by a color development from the respective couplers, an ultraviolet absorbing agent is added to the second interlayer.

However, such conventional print-making color photographic light-sensitive materials have a disadvantage that the dyes formed by a color development from the respective couplers used, particularly the magenta dye and the cyan dye are poor in the resistance to light, tends to be discolored by light with time, and become out of color balance after being discolored.

In that case, if the protective layer also contains an ultraviolet absorbing agent, the resistance to light could be improved.

And by doing so, there is no doubt that the resistance to light of the light-sensitive material can be improved. However, there still exists another disadvantage that the light-sensitive material, after being processed, loses as time goes by the gloss on the surface thereof by light, heat, moisture, and the like; i.e., the so-called sweat phenomenon arises, thus deteriorating the image quality.

OBJECT OF THE INVENTION

The present invention has been made in view of such a situation as described above, and the principal object of the present invention is to provide a color photographic light-sensitive material which is improved so as to prevent possible deterioration of the gloss on the surface thereof caused with time by light, heat, moisture, and the like, and capable of forming a highly light-resistant dye image.

As a result of our various studies on this problem, it has now been found that the above object of the present invention is accomplished by incorporating a 2-(2'-hydroxyphenyl)benzotriazole-type compound in the liquid form at normal room temperature into the overcoat layer on the uppermost silver halide emulsion layer of a multilayered color photographic light-sensitive material.

Namely, the present invention is of a color photographic light-sensitive material comprising a reflective support having thereon a plurality of silver halide emulsion layers, of which the emulsion layer located farthest from the support has, on each of both the support side thereof and the opposite side thereof to the support side, at least one nonlight-sensitive layer containing an ultraviolet absorbing agent, said ultraviolet absorbing agent used in said nonlight-sensitive layer on said opposite side of said emulsion layer against said support being a 2-(2'-hydroxyphenyl) benzotriazole-type compound which is in the liquid form at normal room temperature.

EMBODIMENT OF THE INVENTION

The embodiment of the present invention will be illustrated in detail below:

The color photographic light-sensitive material of the present invention (hereinafter referred as to the light-sensitive material) has not less than two silver halide emulsion layers, and, in the normal form, has three spectrally different light-sensitive silver halide emulsion layers each differently having one of three nondiffusible yellow, magenta and cyan couplers.

The combination of the light-sensitive silver halide emulsion layers with the couplers in a normal instance is such that the cyan coupler is in the red-sensitive silver halide emulsion layer, the magenta coupler in the green-sensitive silver halide emulsion layer, and the yellow coupler in the blue-sensitive silver halide emulsion layer.

There are no special restrictions on the coating order of such respective emulsion layers.

Usually, however, from the reflective support side the yellow coupler-containing emulsion layer, magenta coupler-containing emulsion layer and cyan coupler-containing emulsion layer are coated in the described order. Alternatively, if desired, these layers may also be coated in such an order as of the cyan coupler-containing emulsion layer, magenta coupler-containing emulsion layer and then yellow coupler-containing emulsion layer.

As the yellow, magenta and cyan couplers to be used in the present invention, any known couplers may be used.

Preferred yellow couplers include $\alpha$-pivaloylacetanilide-type couplers.

Preferred magenta, couplers include 5-pyrazolone-type, more preferably, 1-phenyl-5-pyrazolone-type, and further preferably 1-phenyl-3-anilino-5-pyrazolone-type couplers and pyrazolotriazole-type couplers.

Preferred cyan couplers include phenol-type couplers.

Any of these couplers may be contained in an amount of from 0.05 to 1 mole per mole of silver halide in any of the above silver halide emulsion layers.

Of these silver halide emulsion layers, the silver halide emulsion layer located farthest from the support is provided on each of both the support side thereof and the opposite side thereof to the support side with a nonlight-sensitive layer.

These nonlight-sensitive layers comprise such a hydrophilic binder as, e.g., gelatin.

And the nonlight-sensitive layers each contains an ultraviolet absorbing agent.

In this instance, the binder coating amount in each of the nonlight-sensitive layers is normally from 1 to 30 mg/dm$^2$.

On the other hand, of these nonlight-sensitive layers, the one located farther from the support on the emulsion layer located farthest from the support contains not less than one of 2-(2'-hydroxyphenyl)benzotriazole-type compounds which are in the liquid form at normal room temperature. These 2-(2'-hydroxyphenyl)benzotriazole-type compounds preferably have the melting point of not more than 30° C., more preferably not more than 15° C.

The compounds herein are required to be in the liquid form, and, if not, they cannot display the effect to improve the so-called sweat phenomenon, and even if in the liquid form, any ultraviolet absorbing agents other than 2-(2'-hydroxyphenyl)benzotriazole-type compounds cannot carry out the improvement on the prevention of the sweat phenomenon.

The 2-(2'-hydroxyphenyl)benzotriazole-type compounds preferably have the formula:

Formula [I]

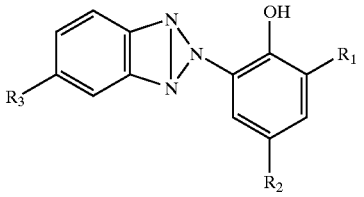

wherein $R_1$ and $R_2$ represent an alkyl, an aryl, an alkoxy and aryloxy radical, and $R_3$ represents a hydrogen atom, a halogen atom, an alkyl, an aryl, an alkoxy, an aryloxy, an alkenyl, a nitro or a hydroxyl radical.

More preferably, the compounds having the formula [I] is represented by Formula [II], [III], [IV] or [V]:

Formula [II]

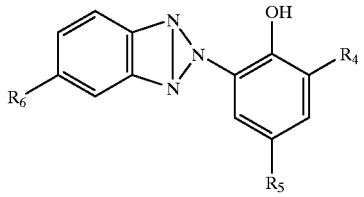

wherein $R_4$ represents a methyl, ethyl or propyl radical, $R_5$ represents a secondary alkyl having from 4 to 10 carbon atoms, $R_6$ represents a hydrogen atom, a halogen atom, an alkyl, or an alkoxy radical having from 1 to 8 carbon atoms;

Formula [III]

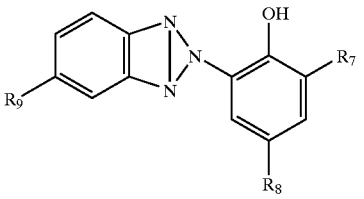

wherein $R_7$, $R_8$ and $R_9$ independently represent an alkyl radical having from 4 to 10 carbon atoms, provided that at least one of $R_7$, $R_8$ and $R_9$ represents a secondary alkyl;

Formula [IV]

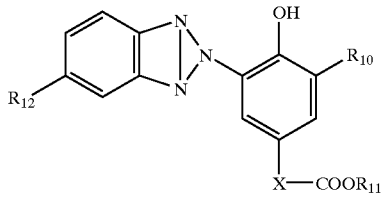

wherein $R_{10}$ represents a secondary or tertiary alkyl from [1] *3* to 8 carbon atoms, X represents an alkylene from 1 to 6 carbon atoms, $R_{11}$ represents an alkyl group from 1 to 12 carbon atoms, $R_{12}$ represents the same radical as defined by $R_6$;

Formula [V]

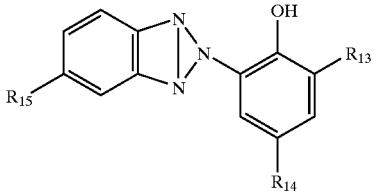

wherein $R_{13}$ and $R_{14}$ independently represent a secondary alkyl having from 4 to 10 carbon atoms and $R_{15}$ represents the same radical as defined by $R_6$.

The following are typical examples of those 2-(2'-hydroxyphenyl)benzotriazole-type ultraviolet absorbing agents which are in the liquid form at normal room temperature, but are not limited thereto.

UV-1L

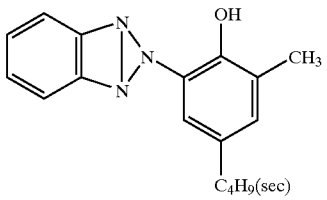

UV-2L

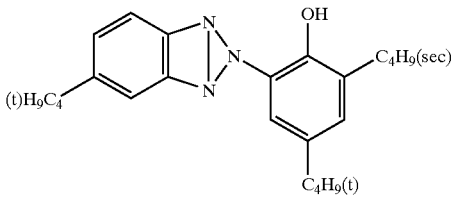

UV-3L

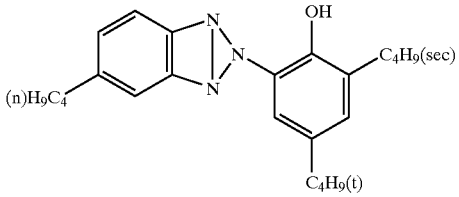

-continued

UV-4L

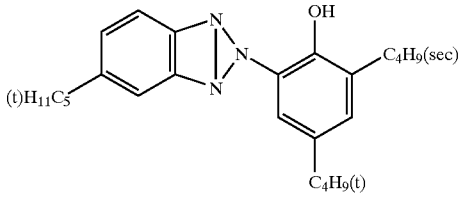

UV-5L

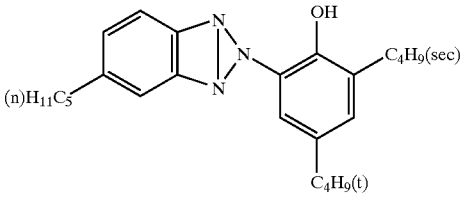

UV-6L

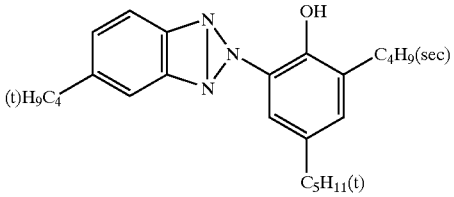

UV-7L

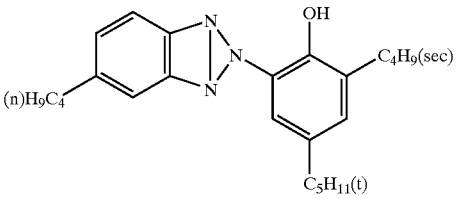

UV-8L

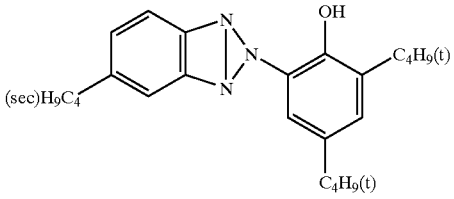

UV-9L

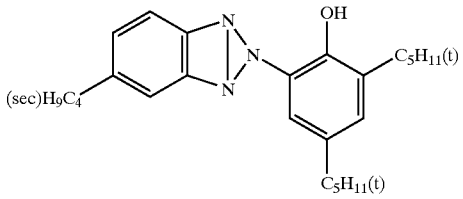

UV-10L

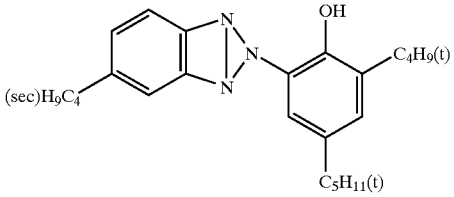

-continued

UV-11L

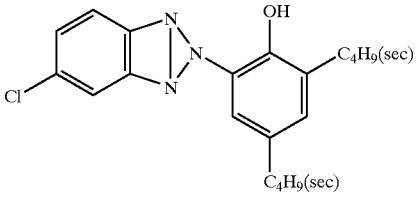

UV-12L

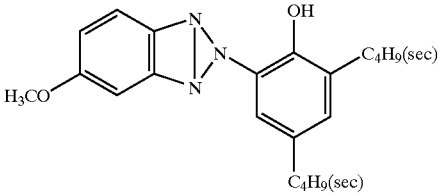

UV-13L

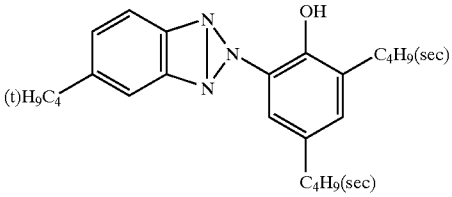

UV-14L

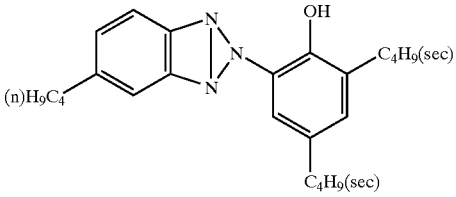

UV-15L

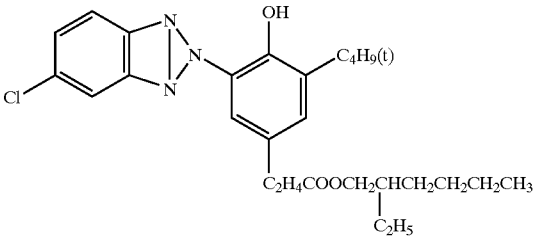

Any of these liquid 2-(2'-hydroxyphenyl)benzotriazole-type ultraviolet absorbing agents may be incorporated singly or in combination of not less than two kinds into the nonlight-sensitive layer adjacent to the outer side (opposite from the support) of the silver halide emulsion layer located farthest from the support.

Any of these liquid ultraviolet absorbing agents may be added to the nonlight-sensitive layer also in combination with any of other ultraviolet absorbing agents which are in the solid form at normal room temperature.

Those suitably available solid ultraviolet absorbing agents are 2-(2'-hydroxyphenyl)benzotriazole-type ultraviolet absorbing agents which are in the solid form at normal room temperature, particularly at 15° C. These compounds preferably have the melting point of not less than 15° C., more preferably not less than 30° C.

If the solid ultraviolet absorbing agent is used in combination with the liquid one, because the molecular weight of the solid one is generally smaller than that of the liquid one, the adding amount by weight of the ultraviolet agent can be reduced, or in the same adding amount, the light-resistant effect of the resulting dye image can be improved. Further, such combined use is advantageous in respect that the using amount of high-boiling solvents that will be described hereinafter can be reduced.

Those solid 2-(2'-hydroxyphenyl)benzotriazole-type ultraviolet absorbing agents are of the foregoing formula but substituted at the 3'-, 5'- and 5-positions each with hydrogen, a halogen, an alkyl, an aryl, an alkoxy, an aryloxy, an alkenyl, hydroxy, nitro or the like radical.

And if these 2-(2'-hydroxyphenyl)benzotriazole ultraviolet absorbing agents are used, the diffusion thereof in the added layer is small, and the compatibility thereof with the liquid ultraviolet absorbing agents is excellent, thus giving satisfactory results.

The following are typical examples of such [liquid] *solid* 2-(2'-hydroxyphenyl)benzotriazole ultraviolet absorbing agents:

UV-1S

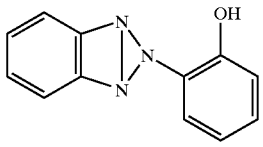

UV-2S

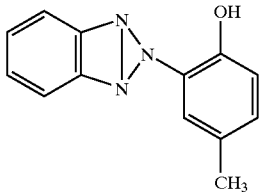

UV-3S

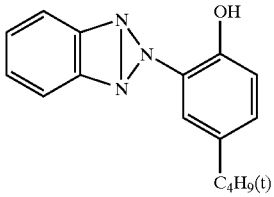

UV-4S

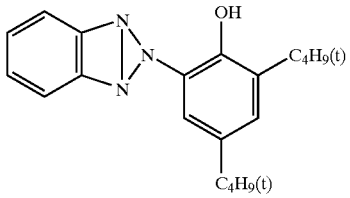

UV-5S

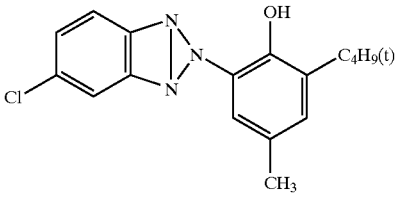

UV-6S

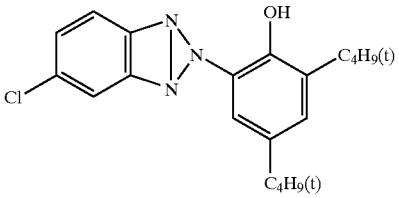

-continued

UV-7S

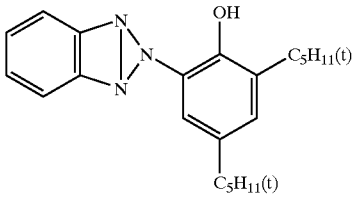

UV-8S

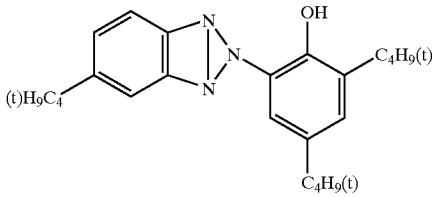

UV-9S

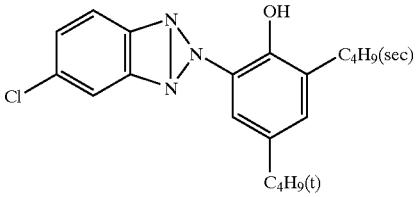

UV-10S

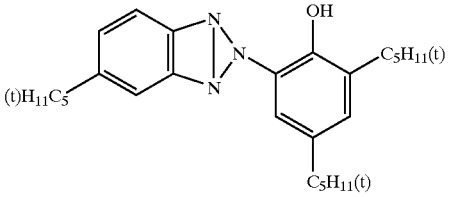

UV-11S

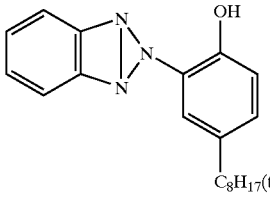

UV-12S

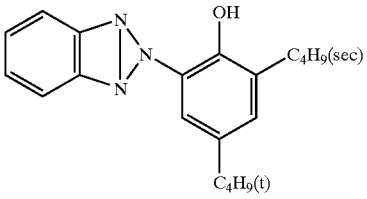

UV-13S

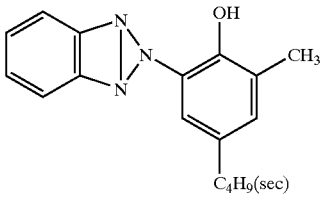

-continued

UV-14S

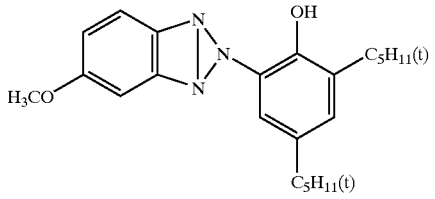

UV-15S

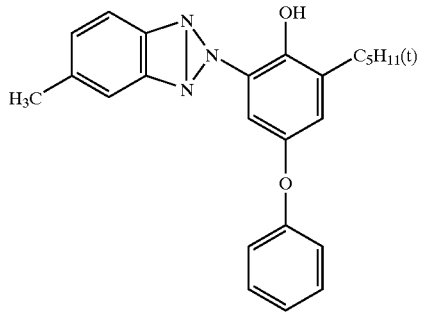

UV-16S

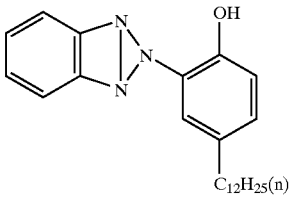

UV-17S

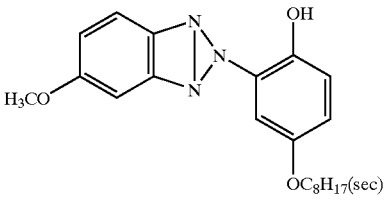

UV-18S

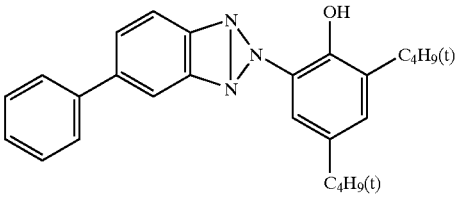

UV-19S

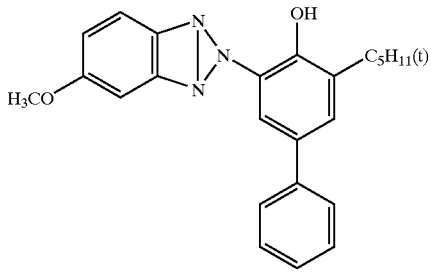

In addition, these liquid and solid benzotriazole-type compounds are described in Japanese Patent Examined Publication Nos. 10466/1961, 26187/1967, 5496/1973 and 41572/1973, and U.S. Pat. Nos. 3,754,919 and 4,220,711, and the like.

In contrast, no special restrictions are put on the use of ultraviolet absorbing agents in the nonlight-sensitive layer adjacent to the support side of the silver halide emulsion layer located farthest from the support, so that they can be various kinds.

However, it is desirable, also in this case, to use 2-(2'-hydroxyphenyl)benzotriazole-type ultraviolet absorbing agents having the following Formula [II] because they have satisfactory compatibility with high boiling solvents and are less-diffusible in the layer:

Formula [II]

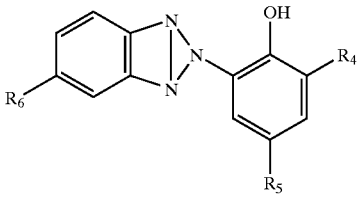

wherein $R_1$, $R_2$ and $R_3$ each represents hydrogen, a halogen, an alkyl, an aryl, an alkoxy, an aryloxy, an alkenyl, nitro or hydroxyl radical.

The ultraviolet absorbing agents used in this case may be either liquid or solid, and may be used either singly or in arbitrary combination of not less than two kinds.

And typical examples of these agents are the foregoing compounds UV-1L to UV-14L and the above UV-1S to UV-19S.

These ultraviolet absorbing agents thus to be contained in the two nonlight-sensitive layers may be contained in the respective layers in a total amount in a ratio of 0.001–2 parts by weight per part by weight of the binder.

In addition, the ratio of the total amount of the ultraviolet absorbing agents in the nonlight-sensitive layer on the support side of the uppermost emulsion layer to the total amount of the ultraviolet absorbing agents in the nonlight-sensitive layer on the opposite side of the same emulsion layer from the support is desirable to be normally from 1:0.1 to 1:100.

Thus, in order to incorporate the ultraviolet absorbing agent into the nonlight-sensitive layer, the agent, if in the liquid form, may, if necessary, be dissolved into a low-boiling solvent, the solution is finely dispersed using a surface active agent into such a hydrophilic binder as an aqueous gelatin solution, and this resulting dispersed liquid is then added to an objective hydrophilic colloidal layer.

Alternatively, in the case where a solid ultraviolet absorbing agent is used or where a liquid and solid ultraviolet absorbing agent are combinedly used, they may, if necessary, be dissolved into a high-boiling solvent whose boiling point is not less than 175° C., or, if necessary, into a mixture of the high-boiling solvent with a low-boiling solvent, the solution is then finely dispersed using a surface active agent into such a hydrophilic binder as an aqueous gelatin solution, and the resulting dispersed liquid is then added to an objective hydrophilic colloidal layer.

The high-boiling solvent used herein includes organic acid amides, carbamates, esters, ketones, urea derivatives, and the like, among which particularly preferred are esters including phthalic acid esters such as dimethyl phthalate, diethyl phthalate, dipropyl phthalate, dibutyl phthalate, di-n-octyl, phthalate, diiso-octyl phthalate di-(2-ethyl-hexyl) phthalate, diamyl phthalate, dinonyl phthalate, diisodecyl phthalate, and the like; phosphoric acid esters such as tricresyl phosphate, triphenyl phosphate, tri-(2-ethyl-hexyl) phosphate, triisononyl phosphate, and the like; sebacic acid esters such as dioctyl sebacate, di-(2-ethyl-hexyl)sebacate, diisodecyl sebacate, and the like; esters of glycerol such as glycerol tripropionate, glycerol tributyrate, and the like; and in addition, adipic acid esters, glutaric acid esters, succinic acid esters, maleic acid esters, fumaric acid esters, citric acid esters, and the like. These may be used singly or in combination of not less than two kinds.

The low-boiling solvent used herein includes methyl acetate, ethyl acetate, propyl acetate, butyl acetate, butyl propionate, cyclohexanol, cyclohexane, tetrahydrofuran, methyl alcohol, ethyl alcohol, acetonitrile, dimethyl formamide, dioxane, methyl-ethyl ketone, methylisobutyl ketone, diethylene glycol monoacetate, acetyl acetone, nitromethane, nitroethane, carbon tetrachloride, chloroform, and the like, and these may be used singly or in combination of not less than two kinds.

Further, as the surface active agent used herein, there may be used such anionic surface active agents as alkylbenzene sulfonate, alkylnaphthalene sulfonate, and the like, and/or such nonionic surface active agents as sorbitansesquioleic acid esters, sorbitanmonolauric acid esters, and the like.

The proportion of the using amount of the high-boiling solvent to that of the ultraviolet absorbing agent is normally not more than 5 parts by weight to 1 part by weight.

In addition, it is desirable to form a nonlight-sensitive layer as a protective layer composed substantially of a binder alone over and adjacent to the opposite side of the uppermost nonlight-sensitive layer from the support.

The forming of the protective layer enables to further reduce the phenomenon of losing the surface gloss with time; i.e., the so-called sweat phenomenon.

The coating amount of the binder of the protective layer is normally from about 1 to about 30 mg/dm$^2$.

Besides, it is desirable to provide a nonlight-sensitive interlayer between the emulsion layer located closest to the support and the intermediate emulsion layer.

This interlayer also has a hydrophilic binder, of which the coating amount is desirable to be from 1 to 30 mg/dm$^2$.

The foregoing two nonlight-sensitive layers and the above interlayer may, if necessary, contain such an anti-stain agent as dioctyl hydroquinone, dibutyl hydroquinone, and the like, a whiteness toning agent, a coating aid, and the like.

And the above-mentioned interlayer may, if necessary, be allowed to contain an ultraviolet absorbing agent as well.

On the premise that the above-described conditions are used, as the dispersion methods for dispersing couplers in the light-sensitive material of the present invention, there may be used various methods such as the so-called aqueous alkaline solution dispersion method, solid dispersion method, latex dispersion method, oil-in-water-type emulsification dispersion method, and the like, from among which any arbitrary method may be selected to be used according to the chemical structure of the coupler used.

Those particularly preferred methods for the present invention are the latex dispersion method and the oil-in-water-type emulsification dispersion method.

These methods are conventionally well-known, and the latex dispersion method and the effect thereof are described in Japanese Patent Publication Open to Public Inspection (hereinafter referred to as Japanese Patent O.P.I. Publication) Nos. 74538/1974, 59943/1976 and 32552/1979, and Research Disclosure Vol. 148, No. 14850 pp. 77–79, August 1976.

Those latexes appropriately usable in the latex dispersion method are homopolymers, copolymers and terpolymers of such monomers as e.g., styrene, ethyl acrylate, n-butyl acrylate, n-butyl methacrylate, 2-acetoacetoxyethyl methacrylate, 2-(methacryloyloxy)ethyl-trimethyl-ammonium-methosulfate, sodium 3-(methyacryloyloxy) propane-1-sulfonate, N-isopropyl-acrylamide, N-[2-(2-methyl-4-oxopentyl)]acrylamide, 2-acrylamide-2-methylpropanesulfonic acid, and the like. As the oil-in-water-type emulsification dispersion method, the conventionally known method for dispersing hydrophobic additives such as couplers may be used which is carried out in the manner that the foregoing coupler is dissolved into a high-boiling solvent such as, for example, N-n-butyl acetanilide, diethyl lauramide, dibutyl phthalate, tricresyl phosphate, N-dodecylpyrolidone, or the like, and the solution is then finely dispersed into a hydrophilic colloid such as gelatin.

The silver halide for use in the silver halide emulsion layers of the light-sensitive material of this invention includes those silver halides arbitrarily usable in ordinary silver halide photographic emulsions such as silver chloride, silver bromide, silver iodide, silver chlorobromide, silver iodobromide, silver chloroiodobromide, and the like.

These silver halide particles may be either coarse-grained of fine-grained, the distribution of which may be either narrower or wider.

And these silver particles may be in the crystal form either normal or twinned having an arbitrary proportion of the [100] face to the [111] face. Further, the crystal structure of these silver halide particles may be either homogenious from the internal to the external or heterogeniously stratified with the internal and the external. These silver halide particles may be either of the type of forming a latent image mainly on the surface thereof or of the type of forming a latent image thereinside.

These silver halide particles may be prepared by any known methods practiced by those skilled in the art.

The silver halide emulsion to be used in the respective emulsion layers of the light-sensitive material of this invention is desirable to be free of water-soluble salts, but may remain undesalted, and further may be a mixture of not less than two separately prepared different silver halide emulsions.

As the binder for the silver halide emulsion layers and for the nonlight-sensitive layers, those conventionally known may be used. Those suitably usable include gelatin and gelatin derivatives such as, e.g., phenyl-carbamylated gelatin, acylated gelatin, phthalated gelatin, and the like. These binder materials may, if necessary, be used in the compatible mixture form of not less than two kinds.

The silver halide photographic emulsion comprising silver halide particles dispersed into a binder solution may be sensitized by chemical sensitizers. Those chemical sensitizers advantageously usable in the present invention are broadly classified into 4: noble-metallic sensitizers, sulfur sensitizers, selenium sensitizers, and reduction sensitizers.

Noble-metallic sensitizers include gold compounds and compounds of ruthenium, rhodium, palladium, iridium, platinum, and the like.

When using gold compound, ammonium thiocyanate or sodium thiocyanate may be used in combination therewith.

Sulfur sensitizers include active gelatin and other sulfur compounds.

Selenium sensitizers include active and inert selenium compounds.

Reduction sensitizers include stannous salts, polyamines, bisalkylaminosulfide, silane compounds, iminoaminomethanesulfinic acid, hydrazinium salts and hydrazine derivatives.

The light-sensitive material of this invention may contain, in addition to the foregoing additives, a stabilizer, development accelerator, hardening agent, surfactant, antistain agent, lubricant, brightening agent mordant, DIR compound, or various other photographically useful additives.

The light-sensitive material of this invention may be further arbitrarily provided with a backing layer in addition to the silver halide emulsion layers, the foregoing nonlight-sensitive layers, interlayers and protective layer.

As the reflective support of the light-sensitive material of the invention, those conventionally known materials such as plastic-laminated paper, baryta paper, synthetic paper, and the like, may be arbitrarily selected to be used according to uses. These support materials are generally subjected to various treatments for increasing the adherence thereof to the emulsion layer.

ACTION OF THE INVENTION

The light-sensitive material of this invention, after being exposed to light through a negative material having an image composed of coupling products, is subjected to color development.

The color development is carried out by an ordinary color developing method.

Namely, the light-sensitive material is first processed in a color developing bath containing a color developing agent. Otherwise, a color developing agent or a precursor thereof is in advance incorporated into the light-sensitive material, which is then processed in an activator solution. After that, in general, the material is bleached and then fixed in the usual way.

The color development by use of a color developer bath or of an activator bath, the bleaching, and the fixing may be independently carried out, but instead of carrying out such two or more processes independently, it is also possible to conduct such processes at a time by use of a processing solution having these functions (monobath); for example, the processing in a monobath of a color developer or an activator containing a bleaching agent and a fixing agent that will be hereinafter described, or the color development followed by the processing in a bleach-fixing bath containing a bleaching agent and fixing agent, and the like.

Otherwise, although the color development by use of the color developer bath or of the activator bath may be immediately followed by the bleach-fixing bath processing for desilvering, an acid stop bath processing may be provided in between the color development and the bleach-fixing bath processing.

The acid stop bath may be an aqueous solution of acetic acid or citric acid. And, if necessary, such processing as prehardening, neutralizing thereof, washing, stabilization, and the like, may be further provided.

When the print-making light-sensitive material is subjected to the above-described processings, a dye image is formed by the coupling reaction inside the light-sensitive material.

The color developing agent used in the processing of the light-sensitive material of this invention is typified by aromatic primary amine color developing agents.

Aromatic primary amine color developing agents include aminophenol-type and p-phenylenediamine-type derivatives. These compounds may be used in the free form or in the form of the hydrochloride thereof, of the sulfate thereof, or of such organic acid salts thereof as p-toluenesulfonate, tetraphenylborate, p-(t-octyl)-benzenesulfonate, and the like.

Typical examples of aromatic primary amine color developing agents are o-aminophenol, p-aminophenol, 5-amino-2-oxytoluene, 2-amino-3-oxytoluene, 2-oxy-3-amino-1,4-dimethylbenzene, N,N-diethyl-p-phenylenediamine hydrochloride, N-methyl-p-phenylenediamine hydrochloride, N-N-dimethyl-p-phenylenediamine hydrochloride, N-ethyl-N-β-methanesulfonamidoethyl-3-methyl-4-aminoaniline and the sulfate thereof, N-ethyl-N-β-hydroxyethylaminoaniline, N-N-diethyl-3-(β-methanesulfonamidoethyl)-4-aminoaniline hydrochloride, 4-amino-N-(2-methoxyethyl)-N-ethyl-3-methylaniline-p-toluenesulfonate, N-ethyl-N-β-methanesulfonamidoethyl-3-methyl-4-aminoanilinetetraphenyl borate, 4-amino-N-(2-methoxyethyl)-N-ethyl-3-methylaniline-tetraphenyl borate, p-morpholinoaniline, p-piperidinoaniline, 4-amino-N,N-diethyl-3-chloroaniline, and the like.

The light-sensitive material of this invention may, if necessary, contain a color developing agent precursor. The color developing agent precursor is a compound capable of producing a color developing agent under an alkaline condition, which includes, e.g., Schiff's base-type precursors with aromatic aldehyde derivatives, multivalent-metallic ion complex precursors, phthalic acid imide derivative precursors, phosphoric acid amide derivative precursors, sugar-amine reactant precursors and urethane-type precursors.

These aromatic primary amine color developing agent precursors are as described in, e.g., U.S. Pat. Nos. 3,342,599, 2,507,114, 2,695,234 and 3,719,492, British Pat. No. 803, 783, Japanese Patent O.P.I. Publication Nos. 135628/1978 and 79035/1979, and Research Disclosure Nos. 15159, 12146 and 13924.

Any of these aromatic primary amine color developing agents are contained in an amount of normally from 1 to 20 g/liter in the color developing solution. If contained in the precursor form in the light-sensitive material, the precursor is incorporated in an amount of normally from 0.5 to 3 moles per mole of silver halide.

The color developing solution or activator solution for use in the light-sensitive material of this invention contains such an alkali agent as potassium hydroxide, sodium hydroxide, sodium carbonate, potassium carbonate, sodium tertiary phosphate, potassium tertiary phosphate, and the like, such as sulfite as sodium sulfite, potassium sulfite, and the like, and such a bromide as sodium bromide, potassium bromide, ammonium bromide, and the like. Further, the solution may, if necessary, contain any of known development restrainers, a thiocyanate such as sodium thiocyanate; potassium thiocyanate, ammonium thiocyanate, and the like; a chloride such as ammonium chloride, potassium chloride, sodium chloride, and the like; an organic solvent such as ethylene glycol, diethylene glycol, methanol, ethanol, n-butanol, benzyl alcohol, acetone, dimethylformamide, and the like; an amine such as hydroxylamine, ethanolamine, ethylenediamine, diethanolamine, and the like; a water softener such as sodium hexametaphosphate, sodium tripolyphosphate, ethylenediamine tetraacetate, diethylenetriamine pentaacetate, and the like; and a water-soluble brightening agent, and the like.

The color developing solution or activator solution used in the present invention may contain an auxiliary developing agent. As the auxiliary developing agent, 1-aryl-3-pyrazolidone derivatives are preferably used, any of which is used in an amount of from 1 mg to 1 g, and preferably from 10 mg to 500 mg per liter of the color developing or activator solution. Typical examples of such auxiliary developing agents are 1-phenyl-3-pyrazolidone, 4-methyl-1-phenyl-3-pyrazolidone, 4,4-dimethyl-1-phenyl-3-pyrazolidone, 4-methyl-4-hydroxymethyl-1-phenyl-3-pyrazolidone, 4-methyl-4-hydroxymethyl-1-(p-tolyl)-3-pyrazolidone, and the like.

The color developing solution or activator solution used in the invention is kept alkaline in the usual way, the hydrogen ion concentration of which, although arbitrarily selectable according to the kind, composition, purposes and uses of the negative material of the print-making light-sensitive material used, is generally from pH 9.5 to pH 13.5.

The color developing solution or activator solution used in this invention is generally used in a certain temperature range. The temperature range, although arbitrarily selectable according to the kind, composition, uses and purposes of the print-making light-sensitive material of the invention, is preferably from 15° C. to 70° C., and more preferably from 30° C. to 50° C.

As the bleaching agent for use in the bleaching bath or in the bleach-fixing bath, any known compounds may be used which include aminopolycarboxylic acid ferric complex salts such as ferric-sodium ethylenediamine tetraacetate, ferric-ammonium ethylenediamine tetraacetate, and the like, and persulfates such as ammonium persulfate, sodium persulfate, and the like.

As the fixing agent for use in the fixing bath or in the bleach-fixing bath, any known compounds may be used which include thiosulfates such as sodium thiosulfate, ammonium thiosulfate, and the like, water-soluble sulfur-containing diols such as 3,6-dithio-1,8-octanediol, 3,6,9,12-tetrathio-1,14-tetradecanediol, and the like, and water-soluble sulfur-containing dibasic acid such as ethylene-bis-thioglycolic acid, sodium ethylene-bis-thioglycolate, and the like.

EFFECTS OF THE INVENTION

According to the present invention, the deterioration (sweat phenomenon) of the surface gloss of the light-sensitive material caused with time after the development of the material by heat, light, moisture, and the like, is remarkably reduced; particularly the deterioration of the surface gloss by light is significantly reduced.

And the resistance to light of the color-developed dye image becomes markedly excellent, so that very little discoloration occurs. The color balance of the dye image, even when discolored, is sufficiently retained.

Further, very few static marks are produced when coating the component layers and when transporting the light-sensitive material through the inside of a photographic printer.

EXAMPLES OF THE INVENTION

The present invention will be illustrated further in detail by the following examples.

EXAMPLE 1

A light-sensitive material was prepared having the component layers as given in Table 1.

TABLE 1

| Layer No. | Layer | Coated amt. of Ag (mg/dm$^2$) | Coated amt. of gelatin (mg/dm$^2$) | Coated amt. of UV absorbing agent (mg/dm$^2$) | Coupler |
|---|---|---|---|---|---|
| Layer 6 | Protective layer | — | 15 | 0 or 4.0 | — |
| Layer 5 | Red-sensitive *EM layer | 3.0 | 20 | — | (C-1) |
| Layer 4 | 2nd interlayer | — | 15 | UV-7S 4.0 | — |
| Layer 3 | Green-sensitive EM layer | 3.0 | 20 | — | (M-1) |
| Layer 2 | 1st interlayer | — | 15 | — | — |
| Layer 1 | Blue-sensitive EM layer | 4.0 | 20 | — | (Y-1) |
| | Polyethylene-coated paper support | | | | |

*EM represents "emulsion"

The kind of the ultraviolet absorbing agent and the kind and amount of the high-boiling organic solvent used in the protective layer and the second interlayer were varied as shown in Table 2, thereby preparing nine samples.

In addition, the structures of the used yellow coupler Y-1, magenta coupler M-1 and cyan coupler C-1 are as indicated below. And in Table 2, the "DBP" represents dibutyl phthalate and the "DOP" represents dioctyl phthalate.

Y-1

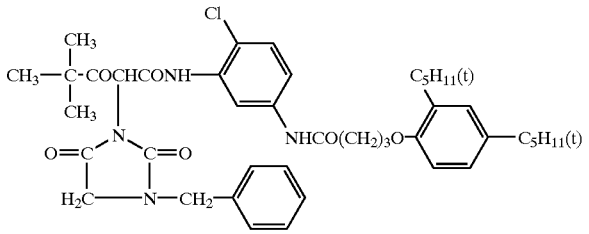

M-1

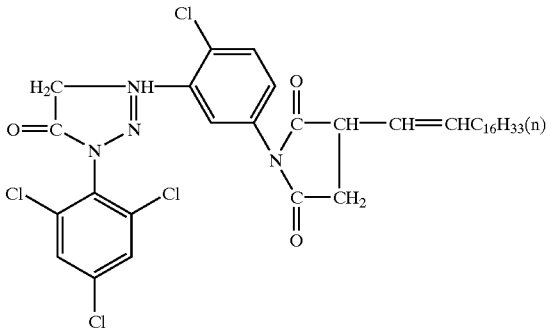

-continued

C-1

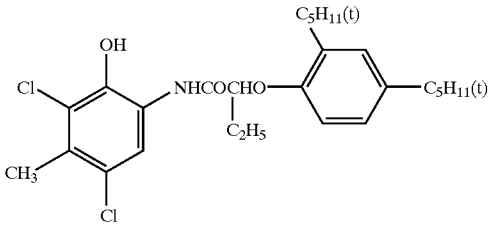

TABLE 2

| Sample No. | UV absorbing agent in protective layer | High-boiling organic solvent: Kind | High-boiling organic solvent: Proportional amt. to UV absorbing agent | Remarks |
|---|---|---|---|---|
| 1 | — | — | — | Control |
| 2 | (UV-7S) | DBP | 1 | " |
| 3 | (UV-7S):(UV-4S) = 1:1 | " | 1 | " |
| 4 | (UV-2L) | DOP | 1 | Invention |
| 5 | " | " | 0.5 | " |
| 6 | " | — | 0 | " |
| 7 | (UV-12L) | DOP | 0.5 | " |
| 8 | (UV-12L):(UV-7S) = 1:1 | " | 0.5 | " |
| 9 | " | — | 0 | " |

Each of the thus prepared samples remaining unexposed was processed according to the following processes, whereby a plain (non-imagewise) sample was obtained.

| Processing steps | Processing time | Processing temp. |
|---|---|---|
| Color development | 3.5 minutes | 33° C. |
| Bleach-fixing | 1.5 minutes | 33° C. |
| Washing | 3 minutes | 33° C. |
| Drying | — | 80° C. |

Color developer bath composition:

| | |
|---|---|
| Pure water | 700 ml |
| Benzyl alcohol | 15 ml |
| Diethylene glycol | 15 ml |
| Hydroxylamine sulfate | 2 g |
| N-ethyl-N-β-methanesulfonamidoethyl-3-methyl-4-aminoaniline sulfate | 4.4 g |
| Potassium carbonate | 30 g |
| Potassium bromide | 0.4 g |
| Potassium chloride | 0.5 g |
| Potassium sulfite | 2 g |
| Pure water to make 1 liter (pH = 10.2) | |

Bleach-fixing bath composition:

| | |
|---|---|
| Iron-ammonium ethylenediamine-tetraacetate | 61 g |
| Diammonium ethylenediamine-tetraacetate | 5 g |
| Ammonium thiosulfate | 125 g |
| Sodium metabisulfate | 13 g |
| Sodium sulfite | 2.7 g |
| Water to make 1 liter (pH = 7.2) | |

The thus obtained plain white samples were subjected to surface gloss deterioration tests under the following various aging conditions. Surface gloss measurements were made by use of a glossmeter manufactured by Tokyo Denshoku K. K. The results obtained by measuring the samples immediately after the processing and the samples after the aging tests are as indicated in Table 3.

| Aging conditions | | |
|---|---|---|
| A: 77° C. | without humidification | 14 days |
| B: 70° C. | 80% Relative humidity | 14 days |
| C: Xenon fademeter | | 400 hours |

TABLE 3

| Sample No. | Surface gloss (%): Right after processing | A 77° C. without humidification | B 70° C. 80% RH | C Xenon fademeter |
|---|---|---|---|---|
| 1 Control | 94 | 87 | 85 | 83 |
| 2 Control | 81 | 78 | 72 | 51 |
| 3 Control | 83 | 80 | 75 | 54 |
| 4 Invention | 88 | 84 | 80 | 75 |
| 5 Invention | 90 | 85 | 81 | 78 |
| 6 Invnetion | 92 | 86 | 83 | 80 |
| 7 Invention | 91 | 85 | 82 | 78 |
| 8 Invention | 89 | 84 | 81 | 77 |
| 9 Invention | 90 | 85 | 82 | 79 |

It is apparent from Table 3 that samples No. 2 and No. 3 which contain in the protective layers thereof ultraviolet absorbing agents for the purpose of improving the resistance to light of the dyes to be formed show remarkable deterioration of the surface gloss thereof by light, heat and moisture, whereas samples No. 4 to No. 9 for the present invention show no deterioration and are much improved in this respect.

Next, these nine samples were subjected to light resistance tests under the testing conditions comprising the above condition C and exposure to the direct rays of the sun over a period of 30 days.

The samples which were used in the test are those prepared in the manner that the samples each was exposed through an optical step wedge to a blue light, green light and red light by use of a sensitometer (Model KS-7, manufactured by Konishiroku Photo Ind. Co., Ltd.) and then processed in the foregoing development processes, whereby three color (yellow, magenta and cyan) separation samples were obtained. As a measure of the resistance to light, the dye residual degree was used which is expressed by the percentage of the reflection density after the exposure to the reflection density (1.0) before the exposure.

In the measurement, as to those whose plain white area is changed to yellow by the exposure (particularly in the yellow-color-developed samples) to affect the density measurement, the remainder of the measured density from which the yellow-discolored density is subtracted was regarded as the after-exposure density. For instance, when the readings were adjusted so that the before-exposure plain white density is 0.00 and the before-exposure yellow density is 1.00, if the after-exposure densities of the plain white area is 0.18 and of the yellow dye is 0.78, then the dye residual percentage is $(0.78-0.18)/1.00\times100=60\%$. The results are as shown in Table 4.

TABLE 4

| Sample No. | Xenon fademeter 400 hrs. Yellow | Magenta | Cyan | Sunlight (direct rays) 30 days Yellow | Magenta | Cyan |
|---|---|---|---|---|---|---|
| 1 Control | 34 | 32 | 30 | 41 | 38 | 35 |
| 2 Control | 52 | 49 | 65 | 61 | 54 | 74 |
| 3 Control | 54 | 51 | 66 | 62 | 57 | 75 |
| 4 Invention | 58 | 59 | 67 | 66 | 71 | 75 |
| 5 Invention | 57 | 58 | 67 | 66 | 70 | 74 |
| 6 Invnetion | 58 | 58 | 66 | 66 | 71 | 75 |
| 7 Invention | 60 | 61 | 68 | 68 | 73 | 77 |
| 8 Invention | 59 | 60 | 67 | 67 | 72 | 76 |
| 9 Invention | 59 | 61 | 67 | 68 | 72 | 77 |

From the results shown in Table 4 it is apparent that samples No. 4 to No. 9, as compared to samples No. 2 and No. 3, are much improved on the resistance to light of the yellow, magenta and cyan dyes thereof, particularly the improvement on the light resistance of the magenta dye is significant.

EXAMPLE 2

A light-sensitive material was prepared having the component layers as shown in Table 5.

TABLE 5

| Layer No. | Layer | Coated amt. of Ag (mg/dm$^2$) | Coated amt. of gelatin (mg/dm$^2$) | Coated amt. of UV absorbing agent (mg/dm$^2$) | Coupler |
|---|---|---|---|---|---|
| Layer 7 | Protective layer | — | 10 | — | — |
| Layer 6 | 3rd interlayer | — | 10 | 4.0 | — |
| Layer 5 | Red-sensitive EM layer | 3.0 | 20 | — | C-2 |
| Layer 4 | 2nd interlayer | — | 15 | 4.0 | — |
| Layer 3 | Green-sensitive EM layer | 3.0 | 20 | — | M-2 |
| Layer 2 | 1st interlayer | — | 15 | — | — |
| Layer 1 | Blue-sensitive EM layer | 4.0 | 20 | — | Y-2 |
| | Polyethylene-coated paper support | | | | |

The structures of the used couplers Y-2, M-2 and C-2 are as shown below. And in the second layer the UV-7S and UV-4S were used in the proportion of 1:1.

Y-2

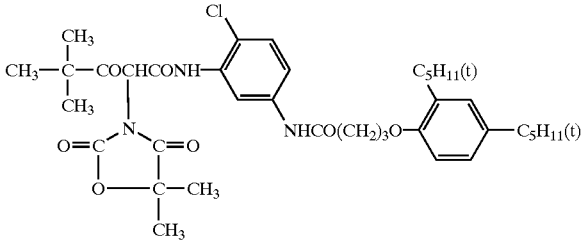

-continued

M-2

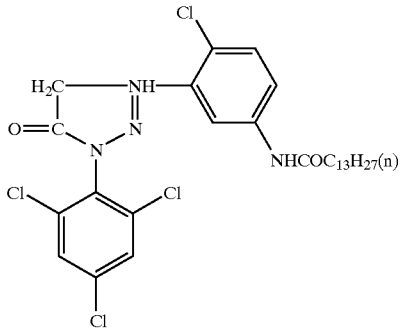

C-2

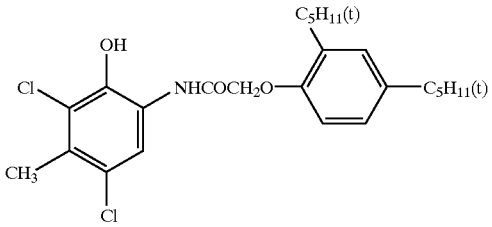

In the above layer composition, the kind of the ultraviolet absorbing agent and the kind and amount of the high-boiling organic solvent used in the third interlayer were varied as given in Table 6, whereby samples No. 1 to No. 5 were prepared.

TABLE 6

| Sample No. | UV absorbing agent in 3rd interlayer | High-boiling organic solvent Kind | Proportional amt. to UV absorbing agent | Remarks |
|---|---|---|---|---|
| 1 | (UV-7S) | DBP | 1 | Control |
| 2 | (UV-4S) | DOP | 1 | " |
| 3 | (UV-1L) | DBP | 0.5 | Invention |
| 4 | (UV-3L) | DOP | 0 | " |
| 5 | (UV-3L):(UV-7S) = 1:1 | DOP | 0.5 | " |

The thus prepared five samples were tested in the same manner as in Example 1.

The results of the surface gloss test are as shown in Table 7 and the results of the light resistance test are as in Table 8.

TABLE 7

| Sample No. | Surface gloss (%) Right after processing | A 77° C. without humidification | B 70° C. 80% RH | C Xenon fademeter |
|---|---|---|---|---|
| 1 Control | 88 | 84 | 81 | 78 |
| 2 Control | 87 | 85 | 80 | 75 |
| 3 Invention | 94 | 92 | 90 | 90 |
| 4 Invention | 95 | 93 | 91 | 90 |
| 5 Invention | 94 | 91 | 89 | 88 |

TABLE 8

| | Fluorescent light tester 400 hrs. | | | Sunlight (under glass) 45 days | | |
|---|---|---|---|---|---|---|
| Sample No. | Yellow | Magenta | Cyan | Yellow | Magenta | Cyan |
| 1 Control | 64 | 61 | 73 | 57 | 57 | 75 |
| 2 Control | 63 | 62 | 72 | 58 | 58 | 75 |
| 3 Control | 66 | 67 | 75 | 61 | 63 | 77 |
| 4 Invention | 65 | 68 | 74 | 60 | 64 | 77 |
| 5 Invention | 67 | 69 | 76 | 61 | 64 | 78 |

From the results shown in Table 7 and Table 8 it is apparent that in the samples for the present invention, not only the formed dyes are highly resistant against light but also the surface gloss is remarkably improved.

What is claimed is:

1. A color photographic light-sensitive material comprising a reflective support having thereon a plurality of silver halide emulsion layers of which the emulsion layer located farthest from said support has, on each of both the support side thereof and the uppermost side at least one nonlight-sensitive layer containing an effective amount of an ultraviolet absorbing agent, said ultraviolet absorbing agent being used in said nonlight-sensitive layer on the uppermost side of said emulsion layer being a 2-(2'-hydroxyphenyl) benzotriazole-type compound which is in the liquid form at normal room temperature, and wherein said 2-(2'-hydroxyphenyl)benzotriazole-type compound [is selected from the group consisting of ] *has the following formula:*

Formula (I)

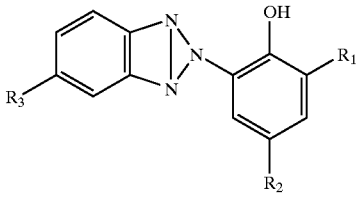

wherein $R_1$ and $R_2$ independently represent an alkyl, an aryl, an alkoxy and an aryloxy radical, *and* $R_3$ represents a hydrogen atom, a halogen atom, an alkyl, an aryl, an alkoxy, an aryloxy, an alkenyl, a nitro or hydroxy radical[;

Formula (II)

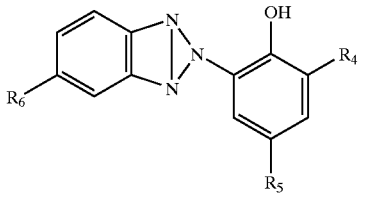

wherein $R_4$ represents a methyl, ethyl or propyl radical, $R_5$ represents a secondary alkyl having from 4 to 10 carbon atoms, $R_6$ represents a hydrogen atom, a halogen atom, an alkyl, or an alkoxy radical having from 1 to 8 carbon atoms;

Formula (III)

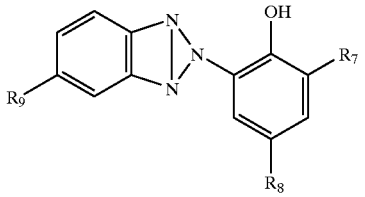

wherein $R_7$, $R_8$ and $R_9$ independently represent an alkyl radical having from 4 to 10 carbon atoms, provided that at least one of $R_7$, $R_8$ and $R_9$ represents a secondary alkyl;

Formula (IV)

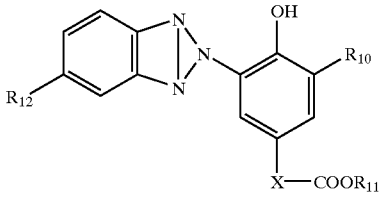

wherein $R_{10}$ represents a secondary or tertiary alkyl having from 1 to 8 carbon atoms, X represents an alkylene having from 1 to 6 carbon atoms, $R_{11}$ represents an alkyl group having from 1 to 12 carbon atoms, $R_{12}$ represents a hydrogen atom, a halogen atom, an alkyl or an alkoxy radical having from 1 to 8 carbon atoms; and Formula (V)

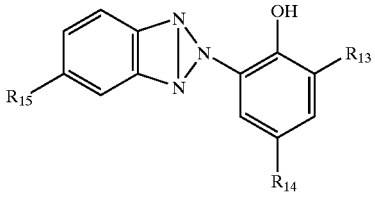

wherein $R_{13}$ and $R_{14}$ independently represent a secondary alkyl having from 4 to 10 carbon atoms and $R_{15}$ represents a hydrogen atom, a halogen atom and an alkoxy radical having from 1 to 8 carbon atoms.].

2. A material according to claim 1, wherein said plurality of silver halide emulsion layers are a yellow coupler-containing emulsion layer, a magenta coupler-containing emulsion layer and a cyan coupler-containing emulsion layer.

3. A material according to claim 1, wherein said emulsion layer located farthest from said support is a cyan coupler-containing layer.

4. A material according to claim 2, wherein said yellow coupler-containing emulsion layer, said magenta coupler-containing emulsion layer and said cyan coupler-containing emulsion layer are provided on said support in this order.

5. A material according to claim 2, wherein said yellow coupler-containing emulsion layer is a blue-light-sensitive emulsion layer, said magenta coupler-containing emulsion layer is a green-light-sensitive emulsion layer and said cyan coupler-containing emulsion layer is a red-light-sensitive emulsion layer.

6. A material according to claim 1, wherein said benzotriazole-type compound has the melting point of not higher than 30° C.

7. A material according to claim 1, wherein said benzotriazole-type compound has the melting point of not higher than 15° C.

8. A color photographic light-sensitive material comprising a reflective support having thereon a plurality of silver halide emulsion layers in which the emulsion layer located farthest from said support has, on each of both the support side thereof and the side opposite from said support, at least one nonlight-sensitive layer containing an effective amount of an ultraviolet absorbing agent, said ultraviolet absorbing agent in said nonlight-sensitive layer on the side of said emulsion layer opposite from said support comprising a 2-(2'-hydroxyphenyl)benzotriazole-type compound which is in the liquid form at normal room temperature, and wherein said 2-(2'-hydroxyphenyl)benzotriazole-type compound has the formula Formula [II]

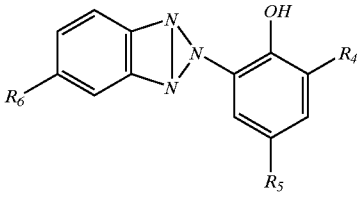

wherein $R_4$ represents a methyl, ethyl or propyl radical, $R_5$ represents a secondary alkyl having from 4 to 10 carbon atoms, and $R_6$ represents a hydrogen atom, halogen atom, an alkyl, or an alkoxy radical having from 1 to 8 carbon atoms.

9. A material according to claim 8, wherein said plurality of silver halide emulsion layers are a yellow coupler-containing emulsion layer, a magenta coupler-containing emulsion layer and a cyan coupler-containing emulsion layer.

10. A material according to claim 8, wherein said emulsion layer located farthest from said support is a cyan coupler-containing layer.

11. A material according to claim 9, wherein said yellow coupler-containing emulsion layer, said magenta coupler-containing emulsion layer and said cyan coupler-containing emulsion layer are provided on said support in this order.

12. A material according to claim 9, wherein said yellow coupler-containing emulsion layer is a blue-light-sensitive emulsion layer, said magenta coupler-containing emulsion layer is a green-light-sensitive emulsion layer and said cyan coupler-containing emulsion layer is a red-light-sensitive emulsion layer.

13. A material according to claim 8, wherein said benzotriazole-type compound has a melting point of not higher than 30° C.

14. A material according to claim 8, wherein said benzotriazole-type compound has a melting point of not higher than 15° C.

15. A color photographic light-sensitive material comprising a reflective support having thereon a plurality of silver halide emulsion layers in which the emulsion layer located farthest from said support has, on each of both the support side thereof and the side opposite from said support, at least one nonlight-sensitive layer containing an effective amount of an ultraviolet absorbing agent, said ultraviolet absorbing agent in said nonlight-sensitive layer on the side of said emulsion layer opposite from said support comprising a 2-(2'-hydroxyphenyl)benzotriazole-type compound which is in the liquid form at normal room temperature, and wherein said 2-(2'-hydroxyphenyl)benzotriazole-type compound has the formula Formula [III]

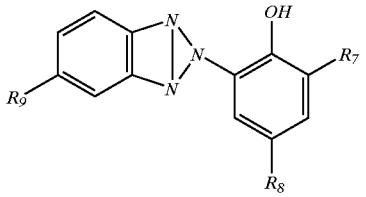

wherein $R_7$, $R_8$ and $R_9$ independently represent an alkyl radical having from 4 to 10 carbon atoms, provided that at least one of $R_7$, $R_8$ and $R_9$ represents a secondary alkyl.

16. A material according to claim 15, wherein said plurality of silver halide emulsion layers are a yellow coupler-containing emulsion layer, a magenta coupler-containing emulsion layer and a cyan coupler-containing emulsion layer.

17. A material according to claim 15, wherein said emulsion layer located farthest from said support is a cyan coupler-containing layer.

18. A material according to claim 16, wherein said yellow coupler-containing emulsion layer, said magenta coupler-containing emulsion layer and said cyan coupler-containing emulsion layer are provided on said support in this order.

19. A material according to claim 16, wherein said yellow coupler-containing emulsion layer is a blue-light-sensitive emulsion layer, said magenta coupler-containing emulsion layer is a green-light sensitive emulsion layer and said cyan coupler-containing emulsion layer is a red-light-sensitive emulsion layer.

20. A material according to claim 15, wherein said benzotriazole-type compound has a melting point of not higher than 30° C.

21. A material according to claim 15, wherein said benzotriazole-type compound has a melting point of not higher than 15° C.

22. A color photographic light-sensitive material comprising a reflective support having thereon a plurality of silver halide emulsion layers in which the emulsion layer located farthest from said support has, on each of both the support side thereof and the side opposite from said support, at least one nonlight-sensitive layer containing an effective amount of an ultraviolet absorbing agent, said ultraviolet absorbing agent in said nonlight-sensitive layer on the side of said emulsion layer opposite from said support comprising a 2-(2'-hydroxyphenyl)benzotriazole-type compound which is in the liquid form at normal room temperature, and wherein said 2-(2'-hydroxyphenyl)benzotriazole-type compound has the formula Formula [IV]

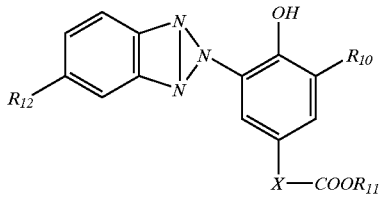

wherein $R_{10}$ represents a secondary or tertiary alkyl having from 3 to 8 carbon atoms, X represents an alkylene having from 1 to 6 carbon atoms, $R_{11}$ represents an alkyl group having from 1 to 12 carbon atoms, and $R_{12}$ represents a hydrogen atom, a halogen atom, an alkyl or an alkoxy radical having from 1 to 8 carbon atoms.

23. A material according to claim 22, wherein said plurality of silver halide emulsion layers are a yellow coupler-containing emulsion layer, a magenta coupler-containing emulsion layer and a cyan coupler-containing emulsion layer.

24. A material according to claim 22, wherein said emulsion layer located farthest from said support is a cyan coupler-containing layer.

25. A material according to claim 23, wherein said yellow coupler-containing emulsion layer, said magenta coupler-containing emulsion layer and said cyan coupler-containing emulsion layer are provided on said support in this order.

26. A material according to claim 23, wherein said yellow coupler-containing emulsion layer is a blue-light-sensitive emulsion layer, said magenta coupler-containing emulsion layer is a green-light-sensitive emulsion layer and said cyan coupler-containing emulsion layer is a red-light-emulsion layer.

27. A material according to claim 22, wherein said benzotriazole-type compound has a melting point of not higher than 30° C.

28. A material according to claim 22, wherein said benzotriazole-type compound has a melting point of not higher than 15° C.

29. A color photographic light-sensitive material comprising a reflective support having thereon a plurality of silver halide emulsion layers in which the emulsion layer located farthest from said support has, on each of both the support side thereof and the side opposite from said support, at least one nonlight-sensitive layer containing an effective amount of an ultraviolet absorbing agent, said ultraviolet absorbing agent in said nonlight-sensitive layer on the side of said emulsion layer opposite from said support comprising a 2-(2′-hydroxyphenyl)benzotriazole-type compound which is in the liquid form at normal room temperature, and wherein said 2-(2′-hydroxyphenyl)benzotriazole-type compound has the formula Formula [V]

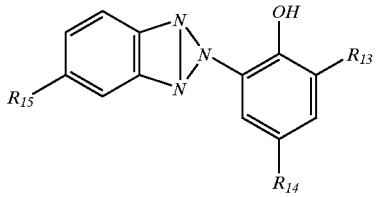

wherein $R_{13}$ and $R_{14}$ independently represent a secondary alkyl having from 4 to 10 carbon atoms and $R_{15}$ represents a hydrogen atom, a halogen atom, an alkyl, or an alkoxy radical having from 1 to 8 carbon atoms.

30. A material according to claim 29, wherein said plurality of silver halide emulsion layers are a yellow coupler-containing emulsion layer, a magenta coupler-containing emulsion layer and a cyan coupler-containing emulsion layer.

31. A material according to claim 29, wherein said emulsion layer located farthest from said support is a cyan coupler-containing layer.

32. A material according to claim 30, wherein said yellow coupler-containing emulsion layer, said magenta coupler-containing emulsion layer and said cyan coupler-containing emulsion layer are provided on said support in this order.

33. A material according to claim 30, wherein said yellow coupler-containing emulsion layer is a blue-light-sensitive emulsion layer, said magenta coupler-containing emulsion layer is a green-light-sensitive emulsion layer and said cyan coupler-containing emulsion layer is a red-light-sensitive emulsion layer.

34. A material according to claim 29, wherein said benzotriazole-type compound has a melting point of not higher than 30° C.

35. A material according to claim 29, wherein said benzotriazole-type compound has a melting point of not higher than 15° C.

* * * * *